UNITED STATES PATENT OFFICE.

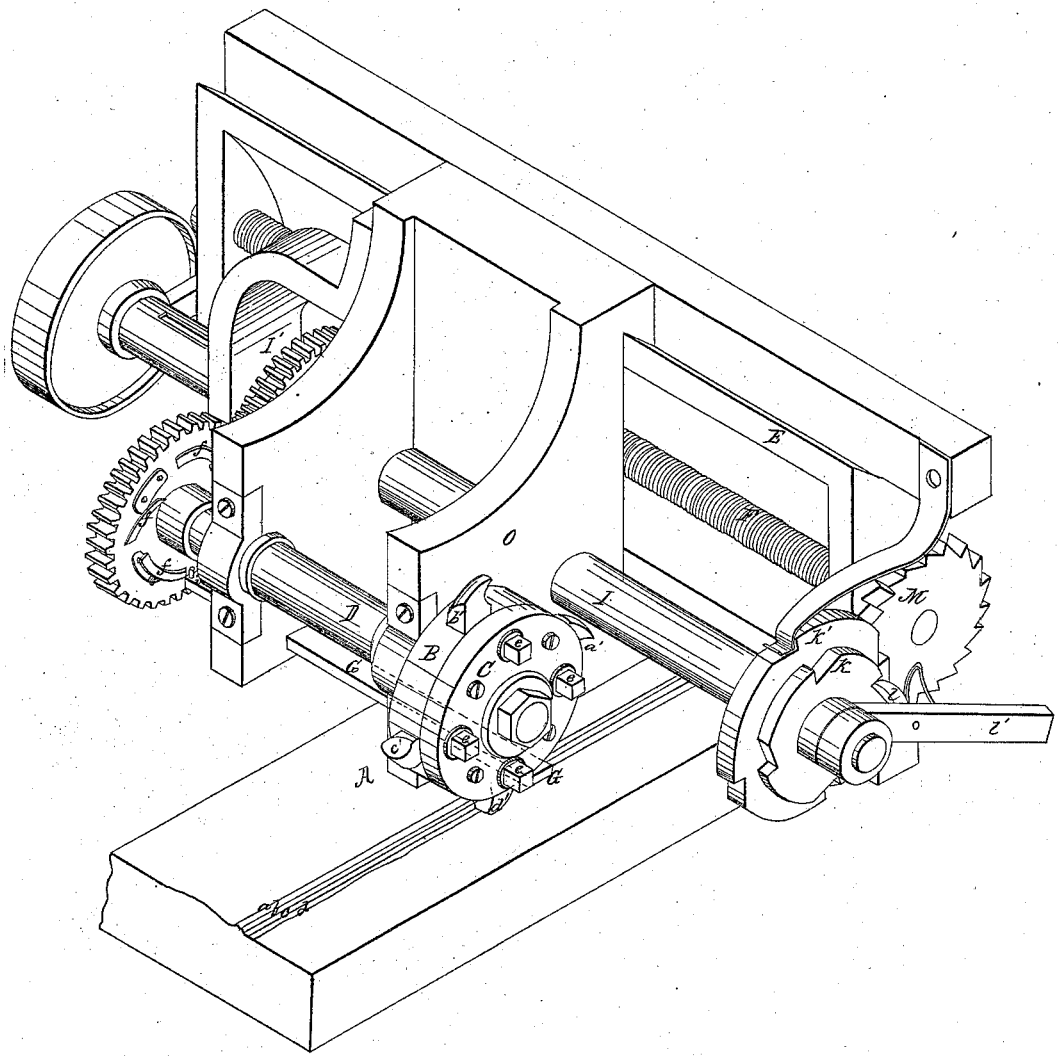

JOSIAH M. SMITH, OF NEW YORK, N. Y.

MACHINE FOR PLANING STONE AND METALS.

Specification of Letters Patent No. 11,275, dated July 11, 1854.

*To all whom it may concern:*

Be it known that I, JOSIAH M. SMITH, of the city, county, and State of New York, have invented certain new and useful Improvements in Planing Machinery for Stone and Metals; and I do hereby declare that the following is a full, clear, and exact description of the same, reference being made to the annexed drawing, making a part of this specification, which is an isometrical view of my invention.

Similar letters refer to similar parts throughout.

My improvement consists in a machine for planing various substances, but is more particularly intended for iron and stone, especially the limestones.

The object designed by me is to finish the surface traversed by the cutters, before moving the metal or stone for a new cut; the idea of which may be better understood by comparison with the old methods. In those, the cutter is a single tool held in a fixed position while the article to be planed passes along under its edge, and receives the cut; the article now returns and the tool is moved along so as to act upon another portion of the surface, and so on until the whole has been gone over; another and differently shaped cutter is now introduced and the article gone over a second time in like manner and so on changing the cutters until the surface has been reduced and a finish effected. To obviate the delays and loss of time belonging to the old system, I place all the variously shaped cutters likely to be required, in a revolving head or clamp and bring them to bear upon the material one after the other as may be required until the surface is finished in that particular line. The revolving head is then moved on, a step further, and a second series of cuts given in like manner as the first, each move of the whole series producing a complete finish as before stated.

At A is represented a block of marble whose surface is to be made level and smooth.

($a$, $b$, $c$, $d$,) show the paths of the several cutters as they have been brought successively into operation to reduce the rough surface to a smooth one.

B is a view of the rotating cutter clamp, shown as having four differently shaped cutters ($a'$, $b'$, $c'$, $d'$,).

C is a disk which is movable and serves to hold the cutters in the places in B, in connection with the pinch bolts ($e$), for the loosening of these pinch bolts allows the cutters to be drawn out or set further in, as the case may require.

D is the spindle for holding the cutter clamp; this is fixed in a frame playing upon a dovetail slide E in the ordinary manner, being moved along at the proper times by the screw F.

At G is a stop-bar for holding the cutter clamp so as to prevent its rotating during the time a cutter is in action. This is made to play back and forth by a set of curved pieces or cams ($f$) on a wheel fixed to the shaft D as shown; these cams are four in number and answer to the number of cutters in B. Whenever the cutter clamp is to be moved, a cam ($f$) engages in the pin ($i$) and withdraws the end of the stop-bar from behind the cutter, as seen at ($d'$); or rather out of the way of the following cutter which is to take the place of ($d'$), the bar springing back in time to prevent the cutter from moving back as it enters the stone and begins its work. Thus before the cutter clamp is allowed to move laterally across the face it has to complete a revolution on its shaft D, so as to bring all four cutters into action one after the other. The cutters ($a'$, $b'$, $c'$,) are gouge-shaped for roughing down, while ($d'$) is square edged to produce the finished surface. Each cutter also projects beyond that other next preceding to a distance equal to the depth of the cut to be taken by the successive movements of the stone under them, ($a'$) takes the first cut, ($b'$) the second, a little deeper, ($c'$) the next, still deeper, this last cut being supposed sufficient to go below the lowest hollows of the unequal surface, and level for the finishing tool which latter ($d'$) completes the operation of smoothing the stone for a space equal to the width of the set of cutters. The head must now move along laterally the required distance for taking down the next portion. This movement as well as the movement of the cutters on their own shaft D is accomplished by the parts connected with a second shaft I. To this latter shaft an intermitted motion of a quarter of a revolution is given by a pawl ($l$), and ratchet wheel ($k$). The ratchet has four notches, and the sweep of the pawl is such as to move a quarter of a revolution at a time, and then urge the shaft I round that distance. The arm ($l'$) is moved up and down by a traversing bar connected to the bed or other part of the machine in a manner common to planing mills, so that as soon as the stone or other article to be planed has been carried along by the bed to receive a cut and is returned to its first position again for a new one, ($l'$) is lifted up, carrying I around, and by the gearing shown at I' revolves the cutter shaft D, which draws back the stop G and brings the next cutter in place. At the fourth vibration of I a pin on the inside of the disk ($k'$) engages in one of the cogs in the wheel M and turns the screw F which moves the cutter-rest O along and thus moves the cutters over a new part of the stone to be planed. This movement occurs at the time the shortest cutter ($a'$) is brought in place to take the first cut. The series are then successively brought into play as before mentioned, and the process is continued until the whole surface has been gone over and the operation completed.

What I claim as of my invention and desire to secure by Letters Patent is—

The revolving disk containing a series of cutters sufficient for completing the planing of a portion of the surface of an object in combination with the rest or slide, substantially in the manner set forth.

JOSIAH M. SMITH.

Witnesses:
S. H. MAYNARD,
GEO. R. SHERMAN.